2 Sheets—Sheet 1.

T. E. DANIELS.
Steam-Feed Cooker and Drier.

No. 225,511.    Patented Mar. 16, 1880.

Witnesses:
F. B. Sormand
H. Bellizer

Inventor:
Taylor E. Daniels
per P. C. Dyrenforth
Attorney.

2 Sheets—Sheet 2.
T. E. DANIELS.
Steam-Feed Cooker and Drier.
No. 225,511. Patented Mar. 16, 1880.
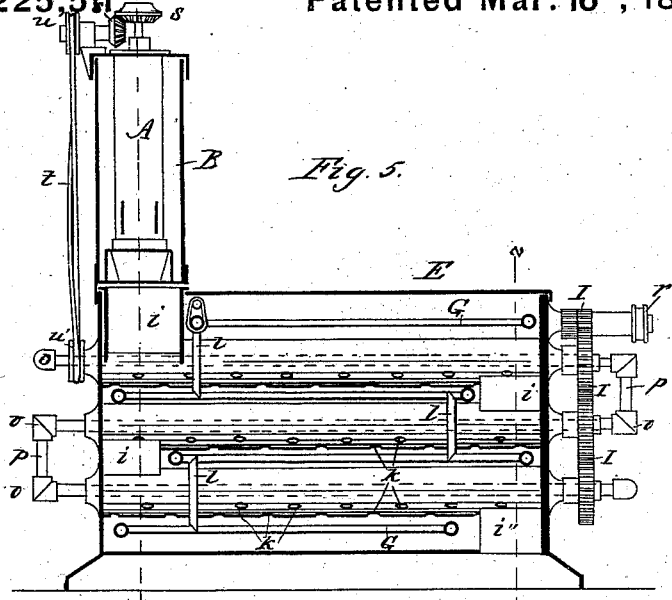
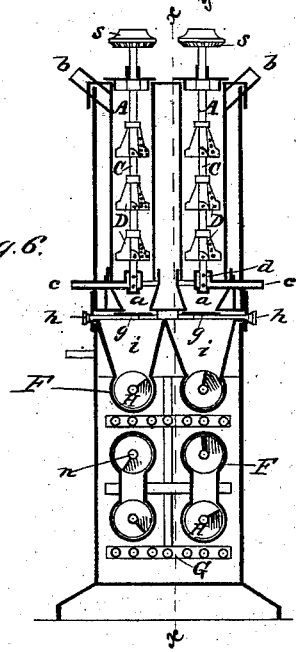
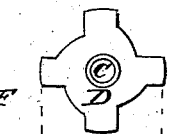
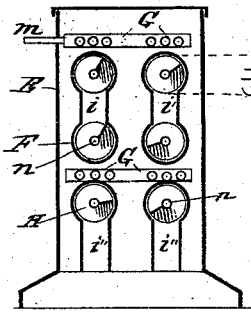
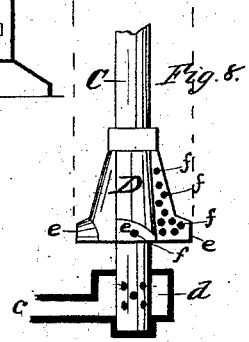
Witnesses:
F. B. Townsend
G. B. Dixon
Inventor:
Taylor E. Daniels,
per R. C. Dyrenforth,
Attorney.

UNITED STATES PATENT OFFICE.

TAYLOR E. DANIELS, OF CHICAGO, ILLINOIS.

STEAM FEED COOKER AND DRIER.

SPECIFICATION forming part of Letters Patent No. 225,511, dated March 16, 1880.

Application filed January 31, 1880.

*To all whom it may concern:*

Be it known that I, TAYLOR E. DANIELS, of the city of Chicago, in the county of Cook and State of Illinois, have invented a new and Improved Steam Feed Cooker and Drier; and I hereby declare the following to be a full, clear, and exact description thereof, reference being had to the accompanying drawings, of which—

Figure 1:
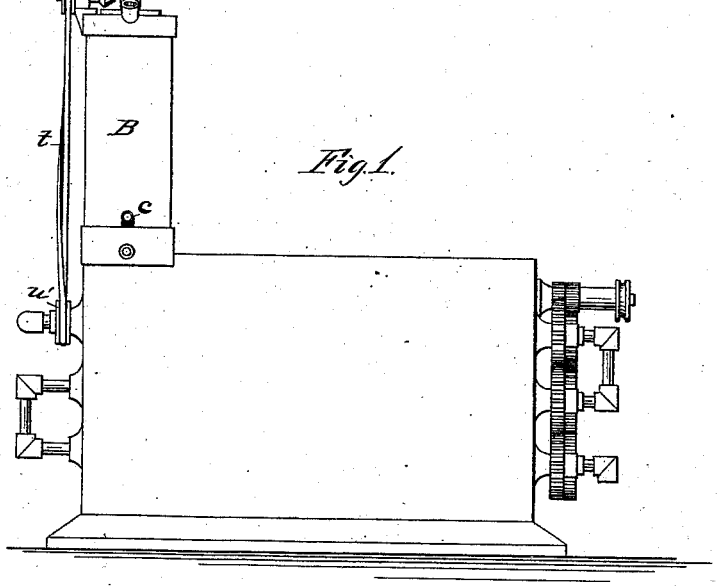
Figure 2:
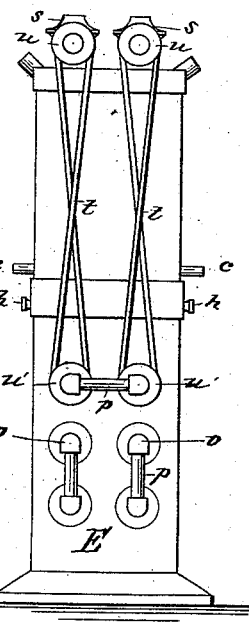
Figure 3:
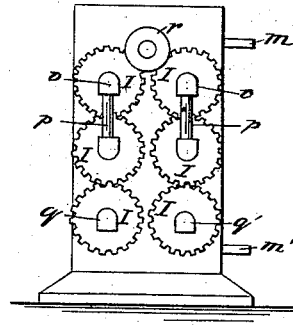
Figure 4:
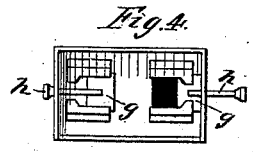

Figure 1 is a side elevation of my apparatus; Figs. 2 and 3, opposite end elevations of the same; Fig. 4, a bottom view of the cooker; Fig. 5, a vertical longitudinal section of the whole apparatus on the line $x\,x$, Fig. 6; Fig. 6, a vertical section on the line $y\,y$, Fig. 5; Fig. 7, a like section on the line $z\,z$, Fig. 5; and Figs. 8, 9, and 10, detail views.

My invention relates to an apparatus for cooking feed by the action of steam and drying the same by means of steam-heat, all in one continuous operation.

My present apparatus embraces the general idea and purpose of the steam feed cooker and drier for which Letters Patent of the United States No. 218,497 were granted to me August 12, 1879; but it is designed to accomplish the results sought in a much more thorough and effective manner, and with a smaller expenditure of power than my said former apparatus, and also to cure a certain elementary defect in principle which has existed in every apparatus for the same purpose heretofore contrived.

The defect referred to lies in the fact that with every such previous apparatus it has been the custom to put the several required varieties of grain, promiscuously mixed together, into a single cooking-chamber, and to subject them all to an equal degree of cooking, no provision being made for the important circumstance that some varieties require more cooking than others to attain a uniform result. I overcome the above defect by providing my apparatus with several (generally two) separate cooking-chambers, in which the contents are subjected to the influence of graduated volumes of steam.

My invention accordingly consists in a steam feed-cooker comprising separate chambers containing stirrers, through which steam enters, and which all receive their rotary motion from a common gearing, and which are provided with perforations for the escape of steam, varying in size or number, or both, for the separate chambers, the whole operating in combination with a drier.

It consists, also, in the peculiar construction of my stirrers, whereby the necessary agitation of the cooking grain is secured with the smallest practicable amount of resistance; also, in the construction of my drier and the several parts thereof, and in various other details and combinations of parts, all as hereinafter more fully set forth.

I shall describe my apparatus as consisting of two cooking-chambers, this number being sufficient for all ordinary purposes, though it is obvious that everything which may be said of two such chambers is equally true of three or more.

A A in the drawings represent these two chambers, provided with hopper-like bases $a$ and with feed-chutes $b$, the whole being inclosed within a case, B, superposed upon the end of the drier. The chambers A are cylindrical in form, and I usually make them separate from the hopper-like base $a$, and have them rest upon a three-armed bearing in the upper part of the latter, one arm of this bearing being the inlet steam-pipe $c$, and the center being a stuffing-box, $d$, within which the perforated hollow shaft C, carrying the cone-like steam-discharging stirrers D, rests and turns. The shafts C are perforated within the stuffing-boxes $d$, and also within the hollow stirrers D, which fit around the said shafts.

These stirrers are formed of thin metal, and consist each of a hollow body inclosed at both ends and having several tapering projections, curved upon one face and flat upon the other, thus giving, in elevation, the form shown in Fig. 8. At its base each projection is extended out horizontally nearly to the wall of the chamber A, as shown at $e$, and the flat face of each projection, as also the extremity of each extended portion $e$, is provided with perforations $f$ for the discharge of steam.

The bottom of each hopper $a$ consists of a sliding door, $g$, operated from without by a rod, $h$, whereby the contents of the cooking-chambers may be discharged as required into the drier below.

The construction of the drier is as follows:

E is a square-cornered case containing six horizontal cylinders, F, extending from end to end of the said case, three below each of the chambers A, as shown in the drawings. The upper cylinder of each series is provided with a hopper, i, immediately under the discharge-door g of the chamber A above it, and at its opposite end communicates, by means of a vertical passage, i', with the next cylinder below it. A similar passage, i', at the opposite end of this second cylinder connects it with the lowest of the series, the opposite end of which, in turn, is provided with a discharge, i'', leading out of the drier. The lower face of each cylinder is further provided with several rows of perforations, k.

G G are four horizontal gates of steam-pipes, one above, one beneath, and the other two between the horizontal cylinders F, and connected together at alternate ends by pipes l, passing between the two series of cylinders, all as shown. Steam is admitted to these pipes through an inlet, m, and discharged through an outlet, m'.

Each cylinder F contains a screw-conveyer, H, the central shaft, n, of which is hollow, and, passing through each end of the case E, turns within the joints o of the connection-pipes p. The connections are so arranged, it will be seen, that steam injected, say, at q passes through all six of the screw-conveyers and escapes at q'. Of course, if preferred, a single set of cylinders and conveyers may be employed, receiving from all the chambers A in common.

All the conveyers of each set are revolved in common, the upper and lower one in the same direction, and the intermediate one in a contrary direction, by means of gear-wheels I, fixed upon their projecting shafts at the end of the drier opposite the cooker. Both sets of gearing may be set in motion by a common belt-pulley, r, as represented, or, if preferred, each set by a separate belt-pulley.

The stirring-shafts C of the cooking-chambers are rotated by means of beveled-gear wheels s s', run by belts t, connecting a pulley, u, on the shaft of each beveled-gear wheel s' with a pulley, u', on the projecting extremity of the shaft of each of the uppermost screw-conveyers.

It will be noted that the cone-like stirrers D in one of the chambers A contain more perforations f than do those in the adjoining chamber. The purpose of this, as before implied, is to permit the escape of a greater volume of steam into the interior of the one designed for those varieties of grain requiring a greater degree of cooking than into the interior of the other, designed for those varieties requiring a less. Substantially the same effect may be produced by making the perforations larger in one set of stirrers than in the other, and they may, if desired, be made both larger and more numerous.

The operation is as follows: Steam is admitted through the pipes c, m, and q, the gearing set in motion by means of the belt-pulley r, and the feed, properly assorted, permitted to enter the chambers A through the chutes b. This causes steam to pass into the interior of the feed to be cooked by way of the shaft C and perforated stirrers D, and also to circulate through the gates of steam-pipes G and through the shafts n of the screw-conveyers. The arrangement of the belts t is such that the stirrers revolve in the direction indicated by the arrows, whereby the curved, and not the flat, faces of the projections act against the cooking grain. The feed passes first one and then another of the conical stirrers, and I find that with a series of four such perforated stirrers it will be sufficiently cooked before reaching the bottom of the chamber. When the portion first introduced reaches the bottom the doors g may be opened and left so. The opening of these doors causes so much of the cooked mass as has passed the last stirrer to drop through the hopper i into the first horizontal cylinder F, along which it is carried by the first screw-conveyer to the passage i', thence dropped into the next cylinder and carried along by the screw-conveyer therein to the next passage i', thence dropped into the lowest cylinder, carried along by the screw-conveyer therein, and finally discharged from the drier through the opening i''. Throughout its whole course through the drier the feed is subjected to the influence of heat from the internal shaft, n, and also from the gates of pipe G, the heat from the latter entering through the perforations k, which should be made so small as not to allow the feed to pass through them, and the result is that it emerges absolutely dry from the discharge-opening i''.

What I claim as new, and desire to secure by Letters Patent, is—

1. A feed-cooker comprising separate chambers A, each containing a vertical hollow shaft communicating with an inlet steam-pipe, and carrying hollow stirrers communicating with the interior of said vertical shaft, and provided unequally for the separate chambers with openings for the discharge of steam, as described, in combination with mechanism for imparting a rotary motion to all of the said shafts and stirrers, and with a drier, substantially as and for the purpose set forth.

2. In combination with the chamber A, vertical revolving shaft C, and steam-inlet pipe c, the conical steam-discharging stirrers D, formed with tapering projections curved upon one face and flat upon the other, and base-extensions e, all as shown, and provided in the said flat faces and base-extensions with apertures f, substantially as described.

3. In a drier, a screw-conveyer, H, having a hollow shaft, n, in combination with means for forcing steam through said hollow shaft, and with an inclosing-cylinder, F, substantially as described.

4. The combination of the chamber A, having a feed-chute, b, and hopper-like base a, provided with discharge-doors g, inlet steam-pipe $c$, stuffing-box $d$, central shaft, C, cone-like steam-discharging stirrers D, beveled-gear wheels $s$ and $s'$, pulley $u$, belt $t$, and pulley $u'$ upon the projecting shaft of the uppermost screw-conveyer of the drier, substantially as described.

5. The drier comprising the case E, one or more sets of horizontal cylinders, F, extending from end to end of said case, each set having a feed-hopper, $i$, connecting-passages $i'$, discharge $i''$, and perforations $k$, all as shown, in combination with the gates of steam-pipes G, having an outlet, $m$, an inlet, $m'$, and communicating with each other at alternate ends, screw-conveyers H, having hollow shafts $n$, gear-wheels I upon the projecting ends of said shafts, and rotated by a pulley-shaft, $r$, joints $o$, connection-pipes $p$, inlet $q$, and outlet $q'$, the whole being constructed and arranged to operate substantially as described.

TAYLOR E. DANIELS.

In presence of—
P. C. DYRENFORTH,
HUGH D. HUNTER.